June 4, 1940.　　　　W. T. JACOBS　　　　2,202,857
FOOTREST FOR VEHICLES
Filed July 26, 1939
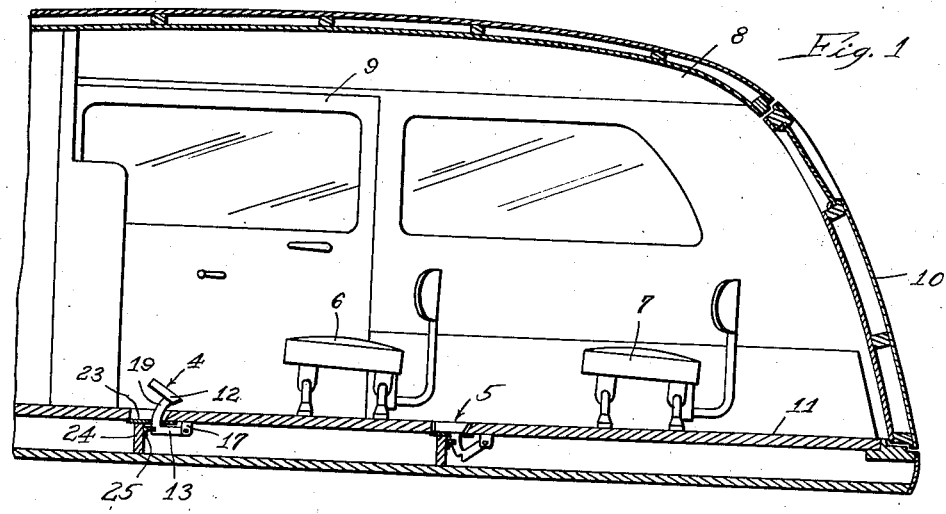
Fig. 1
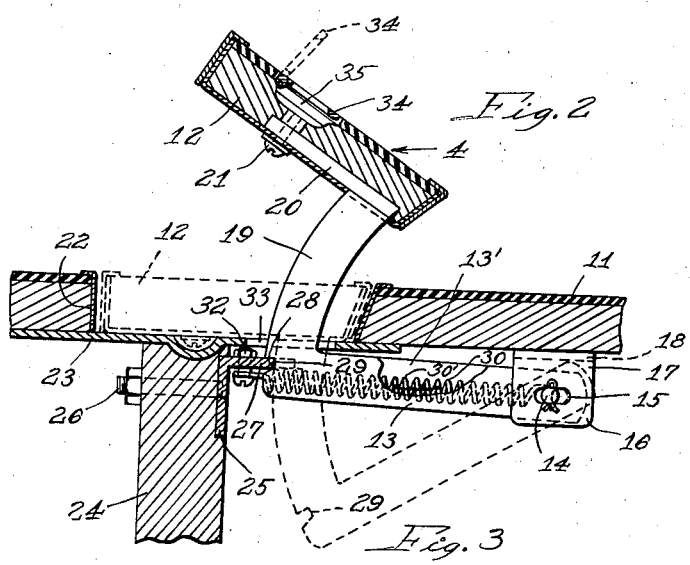
Fig. 2
Fig. 3
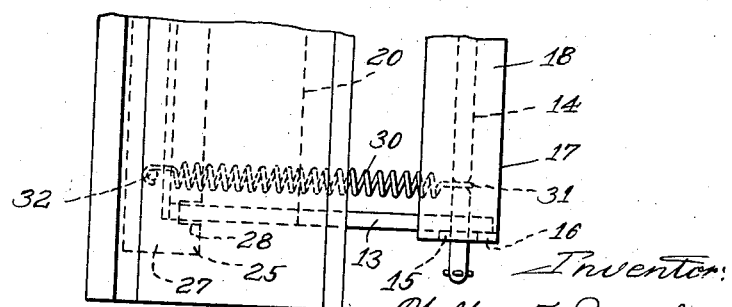
Inventor:
Walter T. Jacobs
By
McCanna, Wintercorn & Morelock
Attys.

Patented June 4, 1940

2,202,857

UNITED STATES PATENT OFFICE 2,202,857

FOOTREST FOR VEHICLES

Walter T. Jacobs, Freeport, Ill., assignor to Henney Motor Company, Freeport, Ill., a corporation of Delaware Application July 26, 1939, Serial No. 286,665

5 Claims. (Cl. 296—75)

This invention relates to footrests for vehicles.

The principal object of my invention is to provide a footrest designed to be raised from a position flush with the floor to an operative position elevated relative to the floor and at a predetermined angle with respect thereto for handy and comfortable engagement by the feet of the user.

I am aware that numerous types of retractible or disappearing footrests have been proposed, but they have invariably been subject to certain serious objections. The objection I consider most serious is that they were apt to collapse under foot pressure. It is therefore the principal object of my invention to provide a footrest which, when elevated for use, is securely locked in the operative position, although it requires only light pressure in the proper direction to release the footrest for movement to retracted position flush with the floor.

A salient feature of this footrest is its slidable pivotal mounting and the provision of spring means tending to move the same in one direction, so that when the foot rest is raised, it automatically becomes locked in the raised operative position and thereafter does not depend upon the operator exercising special care to see to it that the footrest remains locked in such position, the spring pressure being incidentally in a forward direction, so that, in the event of sudden stopping of the vehicle, the increased foot pressure against the footrest only increases its positive locking action, as distinguished from many of the earlier proposed constructions.

The invention is illustrated in the accompanying drawing, in which—

Fig. 1 is a longitudinal vertical section through a portion of the body of an ambulance, showing footrests provided in accordance with my invention, one being shown in raised operative position and the other in retracted position;

Fig. 2 is an enlarged sectional view of the forward footrest, indicating in dotted lines the retracted position thereof, and Fig. 3 is a plan view of Fig. 2, omitting the floor, so as to reveal the footrest bracket therebeneath.

The same reference numerals are applied to corresponding parts throughout the views.

In Fig. 1, I have shown footrests at 4 and 5 in front of the seats 6 and 7, respectively, in an ambulance 8. The latter has side doors, one of which is indicated at 9, and also a back door 10. In such a vehicle, it is obviously highly important that the floor be clear of any obstructions while loading and unloading, and the footrests 4 and 5 of my invention are designed to lie flush with the floor 11 when disposed in retracted position, like the footrest 5 in Fig. 1. It will soon appear that while I have referred to the use of these footrests in ambulances, they may be used in automobiles generally and in any other vehicle, wherever footrests operating in the manner described may be found useful. The invention is furthermore not limited to use of the footrests in vehicles.

Each footrest comprises a toe or foot board 12 swingable on a pair of arms 13—13' disposed in parallel spaced relation adjacent opposite ends of the foot board and pivotally mounted on a cross-rod 14, which in turn is slidably and pivotally mounted in horizontal slots 15 in the opposite end portions 16 of an inverted channel-shaped sheet metal bracket 17 that is suitably secured to the bottom of the floor 11 by its cross-portion 18. Each of the arms 13—13' is of gooseneck form, having an arcuate outer end portion 19 struck on an arc with the rod 14 as a center, the extremities of said end portions 19 having an attaching portion 20 thereon for securing the arms to the bottom of the foot board 12, as by means of bolts 21. The floor 11 is cut away, as at 22, to provide an opening for the foot board 12, and a sheet metal plate 23 is secured to the under side of the floor spanning the opening and forming a closure therefor when the foot board 12 is not disposed in the opening. This plate also serves as a support for the foot board 12 in the retracted position thereof, as indicated in dotted lines in Fig. 2. At 24 is indicated a cross-piece beneath the floor 11 onto which is bolted an angle iron member 25, as indicated at 26. One flange 27 of this angle iron member is disposed horizontally under the plate 23, projecting toward the cross-rod 14. Notches 28 are cut in the outer edge of the flange 27 in which the arcuate portions 19 of the arms 13—13' are slidable up and down. Notches 29 are cut in the outer periphery of the arcuate portions 19 near the lower ends thereof to receive the flange 27 for support of the arms 13—13' in raised position, and two coiled tension springs 30—30' acting between the angle iron member 25 and notched portions of the rod 14 adjacent opposite ends of the latter, as at 31, act to urge the arms 13—13' toward detachable interlocked relationship with the member 25. The springs 30 are suitably secured at their other ends to the angle iron member 25 by bolts, one of which is indicated at 32 in Fig. 2. The plate 23 is slotted, as at 33, in vertical alignment with the notches 28 in the flange 27 for operation of the arcuate portions 19 of the arms 13—13' through said plate. The foot board 12 will have one or more rings 34 pivotally mounted in recesses 35 provided therefor in the top of the foot board, whereby to facilitate raising the footrest to operative position, these rings 34 being swingable outwardly from the foot board, as indicated in dotted lines in Fig. 2.

In operation, when the foot board 12 is in retracted position, the arcuate portion 19 of the arms 13—13' are held under tension of the springs 30—30' in engagement with the flange 27 so that there is no likelihood of the parts rattling when the vehicle is in motion. On the other hand, the spring pressure is not heavy enough to interfere with easy raising of the foot board 12 by means of the rings 34 provided thereon. When the notches 29 come into register with the flange 27, the footrest is automatically locked in relation to the angle iron member 25 under action of the springs 30—30'. The thrust of the springs being in a forward direction, it is obvious that sudden application of the brakes of the evhicle results only in increased locking pressure as the thrust of the feet of the user against the foot board 12 is added to the thrust of the springs. There is therefore no danger of the footrest collapsing accidentally. To lower the footrest, the user may simply apply pressure with his heel against the forward edge of the foot board in a rearward direction, at the same time applying downward pressure on the foot board, so that as soon as the arcuate portion 19 of the arms 13—13' are unlocked from the angle iron member 25, the foot board 12 will drop into place in the opening 22, as indicated in dotted lines in Fig. 2. The footrest is then flush with the floor. The construction is obviously simple, economical, and durable. Once installed, the footrest will never require attention and will operate satisfactorily indefinitely.

It is believed the foregoing description conveys a good understanding of the objects and advantages of my invention. The appended claims have been drawn to cover all legitimate modifications and adaptations.

I claim:

1. The combination in a footrest of a foot board, a pair of pivoted supporting arms having arcuate outer end portions rigidly attached to said foot board, an abutment member in front of said arms to receive and support the arcuate portions thereof, spring means urging said arms bodily forward toward said abutment, and a support rearwardly located relative to said foot board on which said arms are slidably and pivotally mounted.

2. In a vehicle, a footrest capable of receding level with the vehicle floor, comprising a supporting closure plate rigidly attached beneath the vehicle floor covering a foot board opening provided therein, a cross-member under the floor, an angle iron member mounted thereon with one of its flanges horizontally disposed under said opening, a foot board fitting said opening, and supporting arms pivotally supported relative to said floor behind said angle iron member and having notched arcuate portions working through slots in said closure plate and spring-pressed toward detachable locking engagement with said flange of said angle iron member, said arcuate portions supporting said foot board.

3. In a footrest construction, a bracket rigidly attached to the underside of a vehicle floor, having an elongated opening formed parallel with said floor, a cross-shaft slidable therein, a foot board fitting an opening provided therefor in the floor, supporting arms carried on said cross-shaft and carrying said foot board, a keeper in front of said arms, notched ratchets movable with the shaft for detachable locking engagement with the keeper, and spring means urging said shaft and the ratchets therewith in the direction of said keeper.

4. In a vehicle, the combination of a floor level type footrest foot board, a retractable finger pull on top thereof, a pair of arcuate arms rigidly affixed to the underside of said foot board, a supporting bracket having slotted end portions, a shaft journaled in the slots thereof, arms for supporting said foot board for up and down swinging movement pivoted on said shaft and having arcuate outer end portions carrying said foot board, said arcuate portions having notches in the outer edges to engage the edge of a flange on another supporting bracket disposed in forwardly spaced substantially parallel relation to said first bracket, and coiled tension springs acting between the second bracket and said shaft to urge the arms toward locked relationship with said flange.

5. A collapsible footrest for vehicles comprising in combination with a vehicle floor having an opening provided therein for a foot board in retracted position, of a foot board to fit in said opening, supporting means therefor beneath the floor supporting the foot board in the opening flush with the floor, means under the floor providing a slidable, pivotal mounting for said foot board, spring means normally urging the foot board forward in relation to the vehicle to resiliently engage locking means in its raised operative position relative to the floor and to prevent rattling when the foot board is lowered into the floor opening, and locking means partly on the foot board and partly rigid with the floor arranged to be lockingly engaged in the raised position and only frictionally slidably engaged in the lowered position of the foot board.

WALTER T. JACOBS.